UNITED STATES PATENT OFFICE 2,207,759

TREATMENT OF EARTH AND ROCK FORMATIONS

Hans A. Reimers, Midland, Mich., assignor to The Dow Chemical Company, Midland, Mich., a corporation of Michigan No Drawing. Application August 10, 1938, Serial No. 224,147

6 Claims. (Cl. 166—21)

The invention relates to methods of reducing the permeability of earth or rock formations. It more particularly concerns an improved method of bringing about the formation of a plugging deposit in an earth or rock formation penetrated by the bore of an oil or gas well to prevent the infiltration of fluids thereinto.

The infiltration of certain fluids into a well bore is oftentimes undesirable, as for example, the infiltration of water into an oil or gas well. In attempting to shut off the infiltration of water or the like by introducing into the well bore and thence into the surrounding formation, a liquid silicate mixture of the type which is of itself capable of spontaneous transformation into a firm solid gel after a predetermined length of time, I have found that premature and in some cases almost instantaneous solidification of the liquid silicate may occur, regardless of the time calculated to have been required for such solidification. This premature solidification usually occurs before any great amount of the liquid silicate is displaced from the well bore into the surrounding formation, so that it is impossible in many instances to displace an amount of the plugging solution from the well bore that will effectively seal the pores in the formation. In addition to the ineffectiveness of the seal produced, the sealing solution is usually totally wasted. I have also found that in some instances instead of the setting time being greatly accelerated, the time required for solidification of the liquid silicate mixture may be greatly delayed from that calculated so that the well is oftentimes put into production before solidification has actually occurred, and consequently the plugging agent flows or is washed from the well formation before any sealing of the offending stratum is effected.

Liquid silicate mixtures capable of transformation into a suitable gel after a predetermined length of time and affected in the above manner vary widely in composition. Such silicate mixtures may be prepared from organic as well as inorganic silicates and may be acid, neutral, or alkaline in nature. The following examples are illustrative of the compositions and the methods of the preparation of such silicate mixtures.

Example 1

A dilute solution of sodium silicate is prepared by diluting 40 per cent commercial sodium silicate ($Na_2O \cdot 3.22 SiO_2$) with water to a specific gravity of 1.171, giving a solution containing 19.1 per cent by weight of sodium silicate. The dilute solution of sodium silicate so prepared is then added with vigorous stirring to a dilute solution of hydrochloric acid prepared by adding water to concentrated (37 per cent by weight) hydrochloric acid in the following proportions by volume:

| | Per cent by volume |
|---|---|
| Dilute solution of sodium silicate (19.1% by weight $Na_2O \cdot 3.22 SiO_2$) | 10–75 |
| Concentrated hydrochloric acid (37% by weight) | 10–20 |
| Water | 12–70 |

Liquid silicate mixtures having a composition within the range of the above proportions spontaneously become solid gels in from ½ to 25 hours at 120° F. depending on the proportion of each ingredient.

Example 2

A dilute solution of sodium silicate is prepared by diluting 40 per cent sodium silicate

($Na_2O \cdot 3.22 SiO_2$)

with water to the specific gravity of 1.171, giving a solution containing 19.1 per cent by weight of sodium silicate. The dilute solution of sodium silicate so prepared is then added with stirring to a solution of ammonium bicarbonate, prepared by diluting with water a stock aqueous solution of ammonium bicarbonate containing 16.9 per cent by weight of the carbonate in the following proportions by volume:

| | Per cent by volume |
|---|---|
| Dilute solution of sodium silicate (19.1% by weight $Na_2O \cdot 3.22 SiO_2$) | 5–85 |
| Aqueous ammonium bicarbonate solution | 5–85 |
| Water | 0–85 |

Liquid silicate mixtures having a composition within the range of the above proportions spontaneously become solid gels in from ½ to 15 hours at 120° F. depending upon the proportion of each ingredient.

Example 3

Ethyl-ortho-silicate (99% by weight $Si(C_2H_5O)_4$)

is added with stirring to a dilute solution of hydrochloric acid prepared by adding water to concentrated (37% by weight) hydrochloric acid in the following proportions by volume:

| | Per cent by volume |
|---|---|
| Ethyl-ortho-silicate | 2–80 |
| Concentrated hydrochloric acid (37% by weight) | 5–85 |
| Water | 10–75 |

Liquid silicate mixtures having compositions within the range of the above proportions spontaneously become solid gels in from ½ to 15 hours at 120° F. depending upon the proportion of each ingredient.

The reason for the aforementioned anomalous effects, such as premature setting of the above liquid silicate mixtures is not completely understood, but it is believed that it may be due to the presence of scale or like material in the well bore or on the tubing or casing, or to certain constituents ordinarily present in earth or rock formations or deposited therein during the flow of liquids to the well. For example, it is known that the material called "gyp," which is composed of carbonates, sulfides, and the like, is capable of accelerating the solidification of the liquid silicate as well as in some instances of delaying the solidification of the silicate mixture; and it is also known that certain iron compounds, such as iron oxide or sulfide, produce the same effect.

Although the composition of the materials capable of affecting the rate of transformation of the liquid silicate mixture into a solid is not known in all cases, I have discovered that by treating the surfaces to be contacted by the liquid silicate mixture with an acid prior to introducing the liquid silicate mixture into the earth or rock formation adverse effects upon the solidification of the silicate mixtures are prevented and greatly improved results obtained as regards producing an effective seal in the earth or rock formation. Acid agents suitable for use may be any of the commonly known mineral acids, such as hydrochloric, nitric, sulfuric, or mixtures thereof. Organic acids, such as acetic, propionic, chloracetic, and the like, may also be suitably used. In general, I prefer to employ an aqueous solution of hydrochloric acid, because it rapidly attacks and brings into solution the materials interfering with the solidification of the silicate solution, as well as being comparatively inexpensive to use. The concentration of the acid solution to employ may vary widely, e. g. aqueous solutions containing from 1-20 per cent of hydrochloric acid have been satisfactorily employed. The quantity of acid to use varies over wide limits, e. g., from 50 to 500 gallons or more may be used, depending upon the concentration of the acid and the extent of the formation to be treated.

An inhibitor of the action of the acid on metals may be included in the charge of acid introduced prior to the liquid silicate mixture to prevent it from attacking the metal tubing or casing if such are present when the acid is injected into the formation.

In employing a mineral acid, such as hydrochloric, to remove constituents present in the well bore and the formation which effect the normal rate of solidification of silicate mixtures, I have observed that in those instances wherein acid soluble iron compounds are present, the iron first readily dissolves in the acid but as the acid becomes neutralized upon reacting with other soluble constituents which may be present in the formation, the iron precipitates or deposits out and causes the rate of transformation of the silicate solution later introduced to be adversely affected. To overcome this difficulty, I may include in the acid charge an agent capable of preventing the precipitation of soluble iron compounds in their usual pH range of precipitation. For convenience, such agents may be referred to as "stabilizing agents." Specific examples of stabilizing agents suitable for the purpose at hand are glycine, glycollic acid, lactic acid, and the like. A suitable amount of such a stabilizing agent to add to the mineral acid is from between about 1-10 per cent by weight based on the weight of the mineral acid solution.

In accordance with the method of the invention, the infiltration of water into an oil well occurring from a stratum located below the oil producing stratum is shut off in the following manner: In a well equipped with the usual casing and tubing, wherein the casing extends to just above the oil bearing stratum, a packer is placed on the tubing and set between the oil and water strata. An aqueous solution of hydrochloric acid of suitable concentration, such as from 1-20 per cent or more is then introduced into the well through the tubing and a portion of the acid solution is displaced into the formation immediately surrounding the well bore. The acid is held in place by application of pressure, if necessary, until sufficient time has elapsed, generally from 1-3 hours or more, to allow the acid to bring into solution the scale or like material affecting the rate of solidification of the silicate solution. After the acid has been allowed time to react, the liquid silicate solution, such as one of the compositions aforementioned, is introduced into the well bore through the tubing and after the desired quantity is introduced, it is displaced from the well bore into the surrounding formation by applying fluid pressure, if necessary, as by pumping a fluid into the well bore on top of the silicate solution. After the calculated time has elapsed to allow the silicate solution to set, the packer is withdrawn and the well returned to production.

Various other ways of carrying out the plugging treatment according to the invention may be employed. For example, the acid solution may be withdrawn from the well prior to the introduction of the silicate solution to prevent their mixing in the formation; or the silicate solution may be separated from the acid solution after its introduction into the well formation by introducing a quantity of a separating liquid, such as water, oil or like liquid ahead of the silicate solution.

Among the advantages of the invention are that a highly effective sealing deposit can be produced in the pores of an earth or rock formation without the attendant dangers of premature solidification before the silicate solution can be displaced into the earth or rock formation or of its solidification time being greatly delayed, resulting in its being withdrawn from the formation before solidification takes place.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of treating an earth or rock formation by introducing thereinto a liquid silicate mixture of the type which is of itself capable of spontaneous transformation into a gel after a time, wherein the normal rate of transformation of said silicate mixture into a gel is affected by contact with constituents present in the formation, the steps which consist in introducing into the earth or rock formation a quantity of an acid solution, and thereafter introducing into the formation a quantity of said liquid silicate mixture.

2. In a method of treating an earth or rock formation penetrated by the bore of a well by introducing thereinto a liquid silicate mixture of the type which is of itself capable of spontaneous transformation into a gel after a time, wherein the normal rate of transformation of said silicate mixture into a gel is affected by contact with constituents present in the formation, and/or the well bore, the steps which consist in introducing into the well and thence into the surrounding formation a quantity of aqueous hydrochloric acid, and thereafter introducing into the formation a quantity of said liquid silicate mixture.

3. In a method of treating an earth or rock formation penetrated by the bore of a well by introducing thereinto a liquid silicate mixture of the type which is of itself capable of spontaneous transformation into a gel after a time, wherein the normal rate of transformation of said silicate mixture into a gel is affected by contact with constituents present in the formation, and/or the well bore, the steps which consist in introducing into the well and thence into the surrounding formation a quantity of aqueous hydrochloric acid, withdrawing the acid solution from the well after a time, and thereafter introducing into the well and thence into the surrounding formation a quantity of the liquid silicate mixture.

4. In a method of treating an earth or rock formation penetrated by the bore of a well by introducing thereinto a liquid silicate mixture of the type which is of itself capable of spontaneous transformation into a solid gel after a time, wherein the normal rate of transformation of said silicate mixture into a gel is affected by contact with constituents present in the formation, and/or the well bore, the steps which consist in introducing into the well and thence into the surrounding formation an aqueous solution of hydrochloric acid, introducing into the well a quantity of a separating liquid, and thereafter introducing into the well and thence into the surrounding formation a quantity of the liquid silicate mixture.

5. In a method of treating an earth or rock formation penetrated by the bore of a well by introducing thereinto a liquid silicate mixture of the type which is of itself capable of spontaneous transformation into a gel after a time, wherein the normal rate of transformation of said silicate mixture into a gel is affected by contact with constituents present in the formation, and/or the well bore, the steps which consist in introducing into the well a quantity of aqueous hydrochloric acid, introducing into the well a quantity of water, and thereafter introducing into the well and thence into the surrounding formation a quantity of the liquid silicate mixture.

6. In a method of treating an earth or rock formation penetrated by the bore of a well by introducing thereinto a liquid silicate mixture of the type which is of itself capable of spontaneous transformation into a gel after a time wherein the normal rate of transformation of said silicate mixture into a gel is affected by contact with constituents present in the formation, and/or the well bore, the steps which consist in introducing into the well a quantity of aqueous mineral acid containing a stabilizing agent, and thereafter introducing into the well and thence into the surrounding formation a quantity of the liquid silicate mixture.

HANS A. REIMERS.